United States Patent
Vacar et al.

(10) Patent No.: US 7,330,325 B2
(45) Date of Patent: Feb. 12, 2008

(54) PROACTIVE FAULT MONITORING OF DISK DRIVES THROUGH PHASE-SENSITIVE SURVEILLANCE

(75) Inventors: Dan Vacar, San Diego, CA (US); David K. McElfresh, San Diego, CA (US); Kenny C. Gross, San Diego, CA (US); Aleksey M. Urmanov, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 52 days.

(21) Appl. No.: 11/452,702

(22) Filed: Jun. 13, 2006

(65) Prior Publication Data

US 2007/0285821 A1    Dec. 13, 2007

(51) Int. Cl.
G11B 19/02    (2006.01)
(52) U.S. Cl. ........................................ 360/69
(58) Field of Classification Search ............... 360/69, 360/55, 73.02, 51; 318/138, 254; 711/112; 369/44.28, 44.32, 95; 215/303
See application file for complete search history.

(56) References Cited

U.S. PATENT DOCUMENTS

| | | | |
|---|---|---|---|
| 5,276,569 A * | 1/1994 | Even .................... 360/73.02 |
| 5,443,172 A * | 8/1995 | Gabriele .................... 215/303 |
| 5,909,333 A * | 6/1999 | Best et al. .................... 360/51 |
| 6,118,739 A * | 9/2000 | Kishinami et al. ........ 369/44.28 |
| 6,370,094 B1 * | 4/2002 | Kishinami et al. ........ 369/44.32 |
| 6,664,749 B2 * | 12/2003 | Heydt et al. ................ 318/254 |
| 6,771,033 B2 * | 8/2004 | Kokami et al. ............. 318/138 |
| 6,900,604 B2 * | 5/2005 | Kokami et al. ............. 318/254 |
| 6,956,799 B1 * | 10/2005 | Hogan et al. ............ 369/47.28 |
| 6,998,801 B2 * | 2/2006 | Kurosawa et al. .......... 318/254 |
| 2003/0161245 A1 * | 8/2003 | Henrichs ...................... 369/95 |
| 2005/0166015 A1 * | 7/2005 | Bruner et al. ................ 711/112 |
| 2005/0189892 A1 * | 9/2005 | Kokami et al. ............. 318/254 |

* cited by examiner

Primary Examiner—Fred F. Tzeng
(74) Attorney, Agent, or Firm—Park, Vaughan & Fleming LLP (57) ABSTRACT

One embodiment of the present invention provides a system that proactively monitors a disk drive to detect an impending disk drive failure. During operation, the system obtains a time-varying electrical signal which is generated by the spindle rotation during operation of the disk drive. Next, the system extracts one or more inferential parameters associated with the spindle rotation from the time-varying electrical signal using a phase-sensitive detection. The system then performs proactive fault detection on the inferential parameters to detect an impending failure of the disk drive.

27 Claims, 5 Drawing Sheets

PROACTIVE FAULT MONITORING OF DISK DRIVES THROUGH PHASE-SENSITIVE SURVEILLANCE

BACKGROUND

1. Field of the Invention

The present invention relates to techniques for providing fault-tolerance for disk drives in computer systems. More specifically, the present invention relates to a method and an apparatus for proactively monitoring disk drives to identify impending disk drive failures using phase-sensitive detection.

2. Related Art

As computer systems grow increasingly more powerful, they are able to process larger volumes of data and are able to execute larger and more sophisticated computer programs. In order to accommodate these larger volumes of data and larger programs, computer systems are using increasingly higher capacity hard-disk drives (HDD), as well as larger numbers of HDDs, typically organized into disk arrays. For example, some server systems currently support more than 15,000 disk drives. Meanwhile, the storage capacity of a single HDD is quickly approaching 1 Terabyte.

While storage arrays attached to computer systems have become ubiquitous, providing the ability to monitor the health and performance of individual HDDs in a storage array and to perform remedial actions if necessary is extremely advantageous. Allowing data to be corrupted or lost can have a devastating effect on businesses that rely on the data. For example, airlines rely on the integrity of data stored in their reservation systems for most of their day-to-day operations, and would essentially cease to function if this data became lost or corrupted.

Currently, the standard HDD interfaces (SCSI, fiber channel, etc.) can report certain catastrophic malfunctions such as non-spinning disk, head misalignment, etc. This information is processed by the operating system (typically in lower-end storage systems) or a dedicated controller (typically in a service processor in higher-end storage arrays). However, in most cases, by the time the warning messages reach the user (to the console or to a log file), the HDD has already failed.

Consequently, in more sophisticated storage system designs, storage system designers have developed techniques to mitigate the loss of data caused by disk drive failures. In particular, disk drives are often organized into "Redundant Array of Independent Disks" or "RAID" arrays which employ two or more drives in combination to provide data redundancy. For example, in enterprise computer systems, most HDDs are organized into RAID array configurations, so that data loss due to a HDD failure can be recovered from associated drives. Hence, a single HDD failure is not catastrophic for the customer's critical data. Note that even though these redundancy-based techniques can help prevent the loss of data, a failed disk drive must be replaced quickly to maintain system reliability.

Unfortunately, because the capacities of the drives continue to climb exponentially, it can take as long as 10-12 hours for the RAID management software to migrate data following an unexpected drive failure in a storage array. During this time window, if a redundant HDD fails (called a "partner pair" failure), all data on the failed HDDs can be lost. It has been observed that the number of partner pair failures has been climbing steadily while the disk capacity is increasing exponentially.

Note that disk drives can fail in a number of ways. A failure in the electrical circuitry of a disk drive is typically instantaneous and catastrophic. On the other hand, more common mechanical failures often develop over an extended period of time. For example, one of the most common disk drive failures is a failure of the spindle in a HDD. Spindle failures typically take place over an extended period of time as frictional forces gradually wear away at the spindle bearing. In many cases, a spindle can change from being fully functional to completely failed over several hours, or even days. Hence, providing a proactive warning about an incipient problem with the spindle can allow the user to take preventive actions well before a failure actually occurs. In particular, for single HDD systems such as low-end personal systems, such proactive warning can enable the user to do one more backup and then replace the HDD. On the other hand, for systems with HDD arrays, this proactive warning can allow migration software to kick in well in advance of failure, thereby significantly reducing the likelihood of a catastrophic partner pair failure.

Some existing software techniques attempt to detect incipient failures by analyzing read/write errors and retry attempts. While these techniques can be effective in some situations, a disk drive needs to be very close to failure before the software can detect the impending failure. This leaves very little time to replace the failing disk drive.

Another existing technique uses acoustic resonance spectroscopy for high-sensitivity annunciation of disk drives with mechanical problems in advance of failure. More specifically, a microphone records the "sound" generated by each spindle in the HDD array and acquires time series of the Fourier transform of these signals. Subsequent spectral analysis on these signals can detect the onset of failure for individual HDDs in the storage arrays. This technique is described in U.S. Pat. No. 6,782,324 B2 issued on Aug. 24, 2004, entitled, "Method and Apparatus for Using Acoustic Signals to Identify One or More Disk Drives That are Likely to Fail," by inventors Kenny C. Gross and Wendy Lu.

However, because of privacy concerns, businesses are increasingly reluctant to allow "open" microphones to be installed in their computer systems. Moreover, acoustic spectra in large storage arrays have been found to be contaminated with noise associated with the read/write head slider arm control mechanism, which diminishes the signal-to-noise ratio (SNR) for proactive fault monitoring based on acoustics.

Hence, what is needed is a method and an apparatus for providing proactive warning on an incipient problem with the spindle of a HDD without the above-described problems.

SUMMARY

One embodiment of the present invention provides a system that proactively monitors a disk drive to detect an impending disk drive failure. During operation, the system obtains a time-varying electrical signal which is generated by the spindle rotation during operation of the disk drive. Next, the system extracts one or more inferential parameters associated with the spindle rotation from the time-varying electrical signal using a phase-sensitive detection. The system then performs proactive fault detection on the inferential parameters to detect an impending failure of the disk drive.

In a variation on this embodiment, the system obtains the time-varying electrical signal associated with the spindle rotation by measuring a voltage at one or more poles of the spindle motor.

In a variation on this embodiment, the system performs the phase-sensitive detection by using a lock-in amplifier.

In a variation on this embodiment, the system extracts one or more inferential parameters associated with the spindle rotation from the time-varying electrical signal by: (1) feeding the time-varying electrical signal into a phase-sensitive detection module, wherein the time-varying electrical signal serves as both the input signal and the external-reference signal in the phase-sensitive detection module; (2) performing phase-lock detection on the input signal; and (3) obtaining the one or more inferential parameters from outputs of the phase-sensitive detection module.

In a further variation on this embodiment, prior to feeding the time-varying electrical signal as the external-reference of phase-sensitive detection module, the system filters the time-varying electrical signal using a low-pass filter to remove unwanted frequency components from the electrical signal.

In a variation on this embodiment, the inferential parameters can include: (1) a frequency of the rotation; (2) an amplitude associated with a current passing through the spindle motor; and (3) other inferential parameters associated with the spindle rotation.

In a variation on this embodiment, the system constructs time series of the inferential parameters to facilitate the proactive fault detection.

In a variation on this embodiment, the system performs the proactively monitoring on an array of disk drives to detect one or more impending failures in the disk drives.

In a variation on this embodiment, the system obtains the time-varying electrical signal associated with the spindle rotation by using a differential amplifier to provide common-mode rejection.

In a variation on this embodiment, the system performs the proactive fault detection by using Sequential Probability Ratio Test (SPRT).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

It has been observed that the spindle is a critical component associated with the health of a hard-disk drive (HDD). Temporal information related to the rotation of the spindle and the operability of the spindle motor, such as frequency, current, phase information, can be extremely valuable in predicting an onset of a failure of the spindle and accompanying failure of the entire HDD. Unfortunately, time series of these variables are not being made available outside the HDD (via standard interfaces), nor do the HDD vendors make use of this information to predict failures and proactively enhance the reliability of the drives.

The present invention provides a fully electronic monitoring scheme to obtain deterministic spindle-related signals with a significantly improved signal-to-noise ratio (SNR) than previously described acoustic signals. The acquired signals are subsequently fed into a fault-detecting tool, which for example, may perform Sequential Probability Ratio Test (SPRT), for high sensitivity and reliability failure detection.

Computer System with a Storage Array

Figure 1:
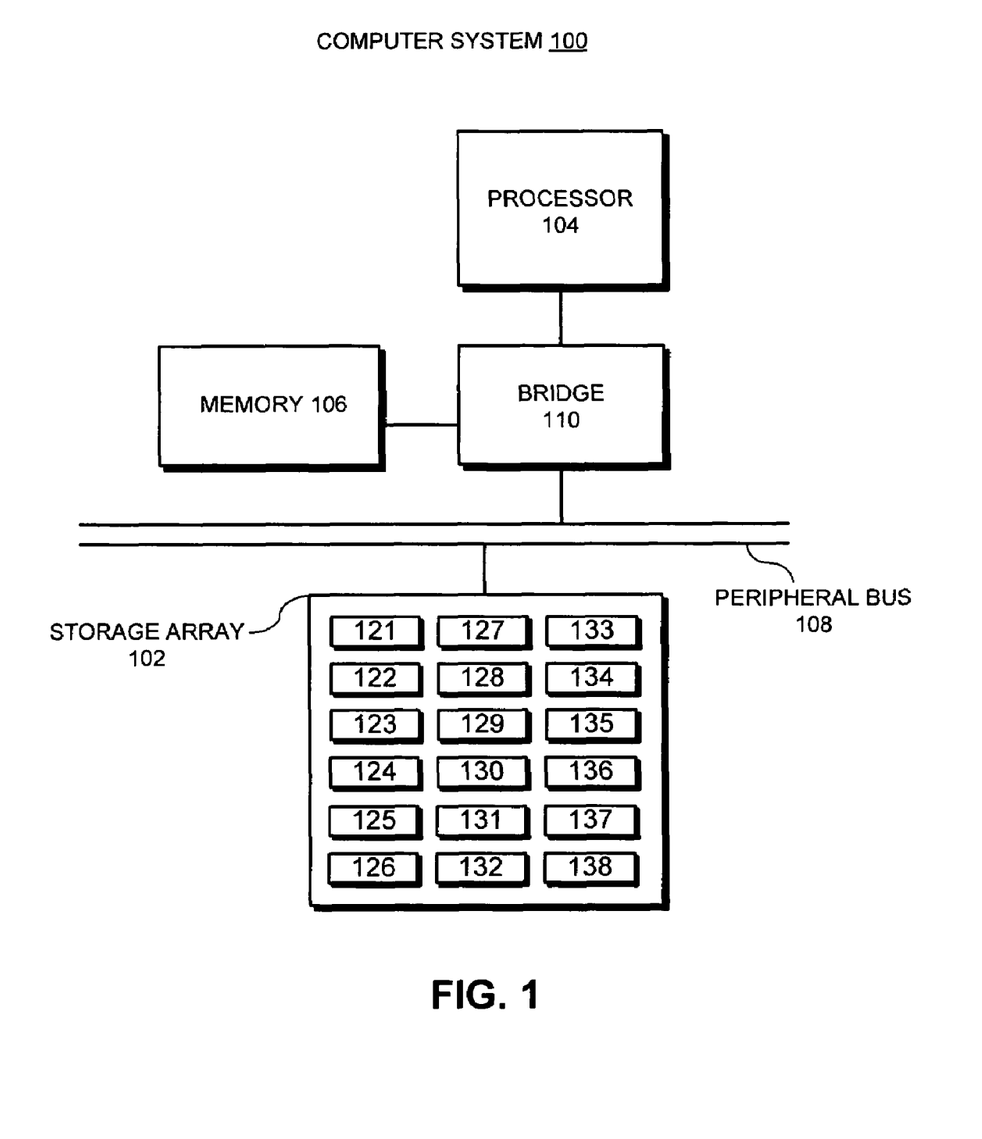
FIG. 1 illustrates a computer system comprising a storage array in accordance with an embodiment of the present invention.

FIG. 1 illustrates a computer system 100 comprising a storage array 102 in accordance with an embodiment of the present invention. As illustrated in FIG. 1, computer system 100 includes processor 104, which is coupled to a memory 106 and a peripheral bus 108 through bridge 110. Bridge 110 can generally include any type of circuitry for coupling components of computer system 100 together.

Processor 104 can include any type of processor, including, but not limited to, a microprocessor, a mainframe computer, a digital signal processor, a personal organizer, a device controller and a computational engine within an appliance.

Processor 104 communicates with memory 106 through bridge 110. Memory 106 can include any type of memory that can store code and data for execution by processor 102.

Processor 104 communicates with storage array 102 through bridge 110 and peripheral bus 108, wherein storage array 102 comprises 18 HDDs labeled from 121 to 138.

Note that although the present invention is described in the context of computer system 100 comprising an array of HDDs, the present invention can generally be extended to storage arrays comprising other type of rotating non-volatile storage devices, which can include, but is not limited to, optical, magneto-optical, ferromagnetic disk drives. Furthermore, the present invention is applicable to any computing system that comprises at least one rotating disk drive storage device. Hence, the present invention is not limited to the computer system 100 illustrated in FIG. 1.

HDD and HDD Spindle

Figure 2:
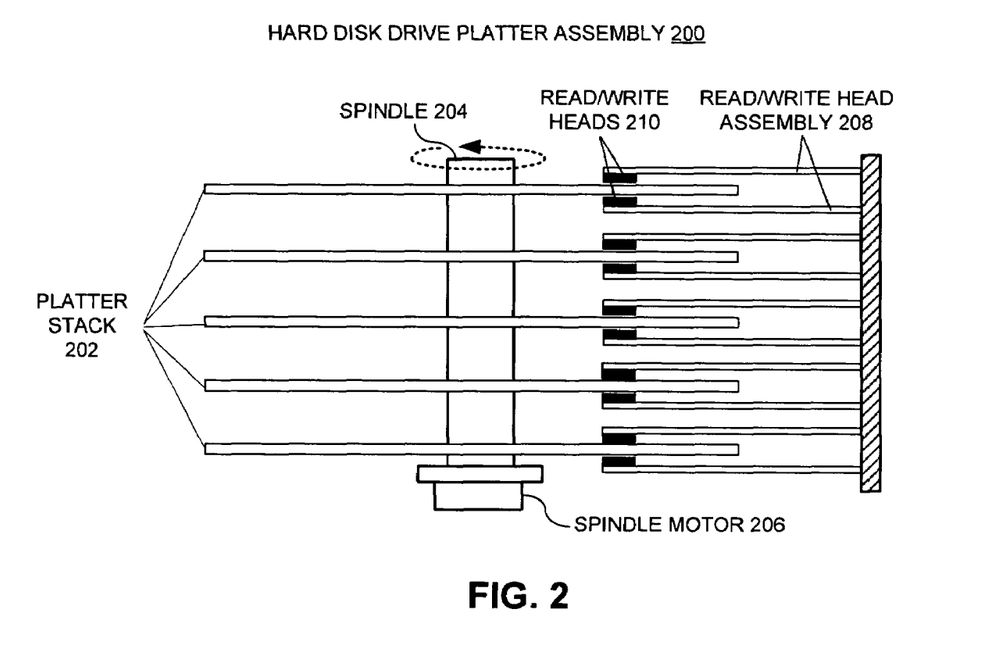
FIG. 2 illustrates a side-view schematic of a HDD platter assembly in accordance with an embodiment of the present invention.

FIG. 2 illustrates a side-view schematic of a HDD platter assembly 200 in accordance with an embodiment of the present invention.

HDD platter assembly 200 comprises a platter stack 202, which includes five platters. A magnetic recording medium is coated on both top and bottom surfaces of each platter for information storage. Note that the number of platters in a platter stack can be less or more than five illustrated in FIG. 2.

The platters in platter stack 202 are separated by spacers between them to maintain a specific distance and provide room for the read/write heads. Furthermore, the platters are clamped to a rotating spindle 204 which rotates all the platters in unison during operation. A spindle motor 206 is attached to spindle 204 directly below platter stack 202 and spins the platters at a constant rotation rate ranging from 3,600 to 15,000 rotation per minute (RPM). The spindle rotation operation is highly demanding for precision, stability, and minimum of vibration. Hence spindle motor 206 is typically controlled by a feedback loop to ensure that it spins at precisely the speed it is supposed to. Note that there is a read/write head assembly 208 for each platter in FIG. 2, wherein read/write heads 210 maintain an extremely small space (<10 nm) between themselves and the platter surfaces during operation. Consequently, the read/write operations require extremely smooth and stable rotation of the platters which is provided by the spindle and spindle motor.

In order to monitor the health of the spindle and predict an impending failure associated with spindle operation, time-varying signals associated with spindle rotation and operability can be collected and analyzed. These signals can include, but are not limited to, frequency, current, voltage, and phase signals. Note that such information is not available via standard HDD interface, and has to be additionally measured.

Pole Voltage in the Spindle

Figure 3:
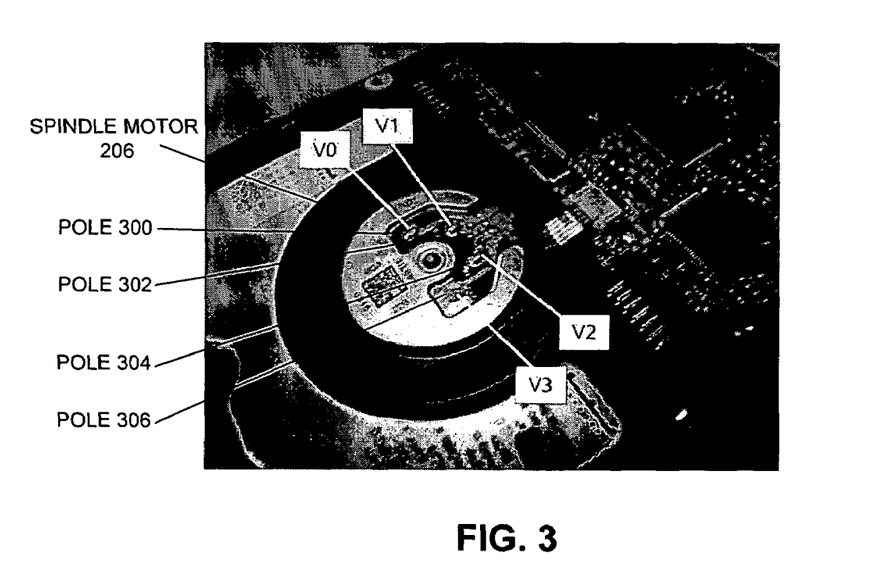
FIG. 3 presents a picture illustrating locations for measuring voltages at poles of the spindle motor in the HDD in accordance with an embodiment of the present invention.

FIG. 3 presents a picture illustrating locations for measuring voltages at poles of the spindle motor in the HDD in accordance with an embodiment of the present invention. Note that FIG. 3 provides a bottom view of the HDD in the perspective of FIG. 2.

Note that there are four poles 300, 302, 304, and 306 in spindle motor 308, wherein these poles are labeled with corresponding pole voltages V0, V1, V2, and V3, which are measured at each pole. In one embodiment of the present invention, the pole voltages are measured in single-ended mode with respect to the ground (not shown), for example, V1 is the pole voltage measured at pole 302 with respect to the ground.

In another embodiment of the present invention, the pole voltages are measured in differential mode with respect to a common pole. Note that the raw pole voltages can be very noisy with low SNR and further contaminated with unwanted frequency components. Using differential measurement can partially improve the signal quality by providing common-mode noise rejection.

For example, pole 306 can be made as the common pole among all the poles, hence V3 becomes common voltage in the differential mode. In this case, pole voltages V0, V1, and V2 are measured with respect to the common pole voltage V3, wherein a differential signal, for example, V0-V3, is collected for pole 300. A simple harness, such as a pair of wires, allows the pole voltages to be continuously measured in either differential mode (with respect to a common pole) or in single-ended mode (with respect to the ground).

Note that the pole voltages are periodical signals with frequencies related to the RPM of the spindle. In one embodiment of the present invention, the frequency of the pole voltage signals is 4× of the spindle RPM due to four rotating magnets inside the spindle motor. For example, for a HDD with a 10000 spindle RPM, or $f_{spindle}$=167 Hz, the frequency of the pole voltages V0, V1, and V2 are approximately $f_{pole}$=668 Hz. Moreover, the amplitudes of these periodical signals are strongly tied to the current passing through the spindle motor. Consequently, the pole voltages can be used to derive some of the critical spindle parameters, including the RPM and the operating current.

Storage Array Health Monitoring System

Figure 4:
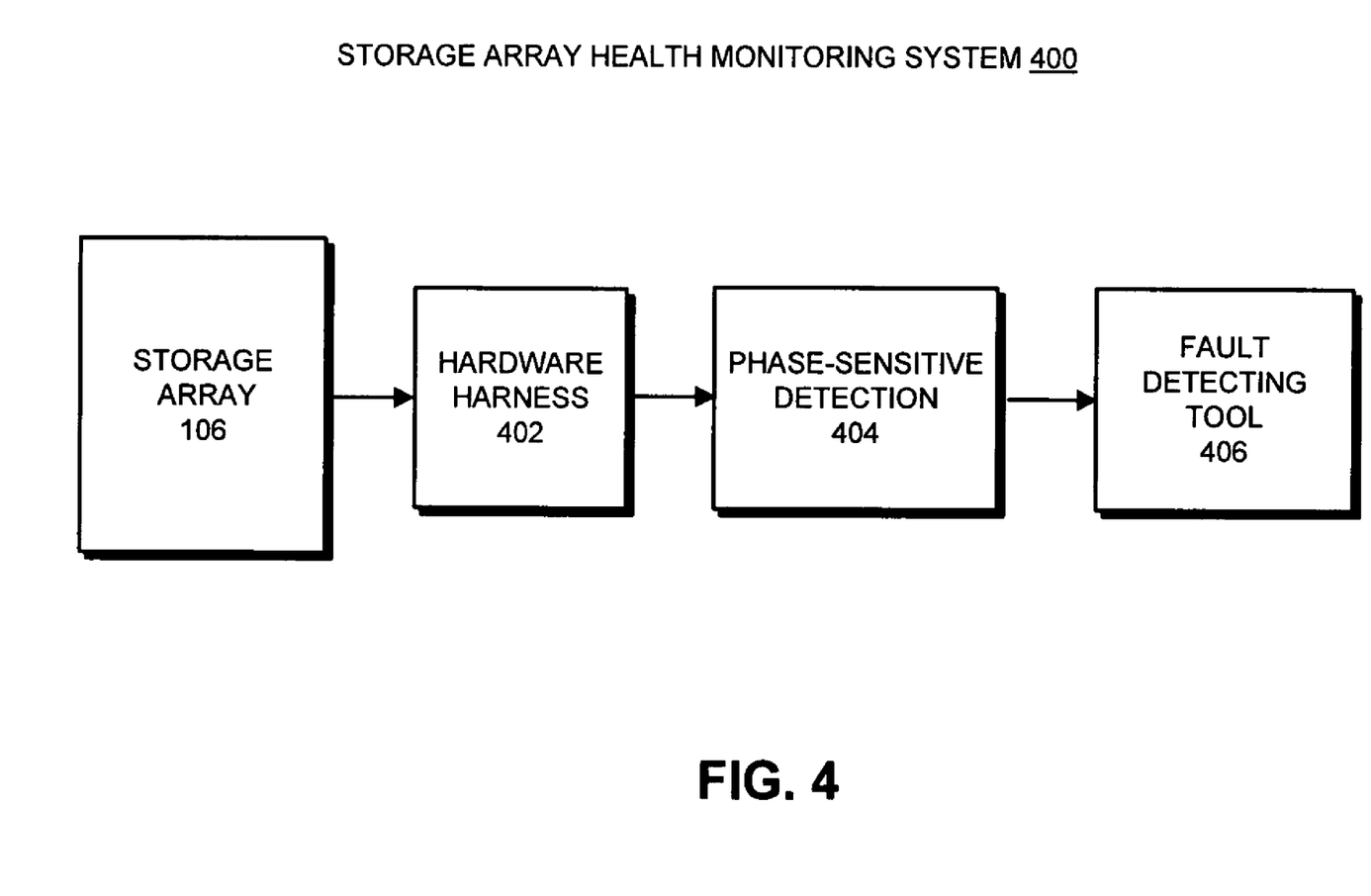
FIG. 4 illustrates a storage array health monitoring system in accordance with an embodiment of the present invention.

FIG. 4 illustrates a storage array health monitoring system 400 in accordance with an embodiment of the present invention. Health monitoring system 400 includes above-described storage array 106. Storage array 106 is coupled to hardware harness 402, which continuously measures time-varying electrical signals from the spindle motors of the HDDs and feeds these signals into phase-sensitive detection 404. As mentioned above, the time-varying electrical signals typically include pole voltages in the spindle motor.

Note that hardware harness 402 allows measuring individual HDDs in storage array 106, wherein the measurements can be performed sequentially or simultaneously through the disk array. Also note that although we show hardware harness 402 as a separated module from storage array 102, hardware harness 402 can also be integrated with storage array 102 to provide in-situ spindle operation surveillance.

Phase-sensitive detection 404 detects and extracts spindle-rotation parameters from the measured electrical signals, wherein the spindle-rotation parameters can include spindle rotation frequency (RPM) f, amplitude V associated with spindle motor current, and phase p of the spindle motor. Note that these spindle-rotation parameters are inferential information for the health of the spindle and the HDD.

Frequency f, amplitude V and phase p can then be sampled to generate time series data at each sampling time $t_i$, wherein a point comprises a set of spindle-rotation parameters $\{f(t_i), V(t_i), p(t_i)\}$ is recorded.

Next, fault-detecting tool 406 analyzes time series data generated by phase-sensitive detection 404. Specifically, fault-detecting tool 406 use standard proactive-failure-monitoring techniques to detect an incipience or onset of failure in the spindles of the monitored HDDs with high sensitivity. In one embodiment of the present invention, fault-detecting tool 406 performs a Sequential Probability Ratio Test (SPRT) on these spindle-rotation parameters.

Because a storage array can produce a large number of time series for all HDDs in the array, it is challenging to use a single fault-detecting tool to monitor and analyze this large amount of data without a data storage facility. Consequently, one embodiment of the present invention provides a time-series-data repository, which stores the newly generated time-series for each HDD. Fault-detecting tool 406 can directly access this time-series-data repository either in real-time or offline as needed.

Phase-Sensitive Detection

Figure 5:
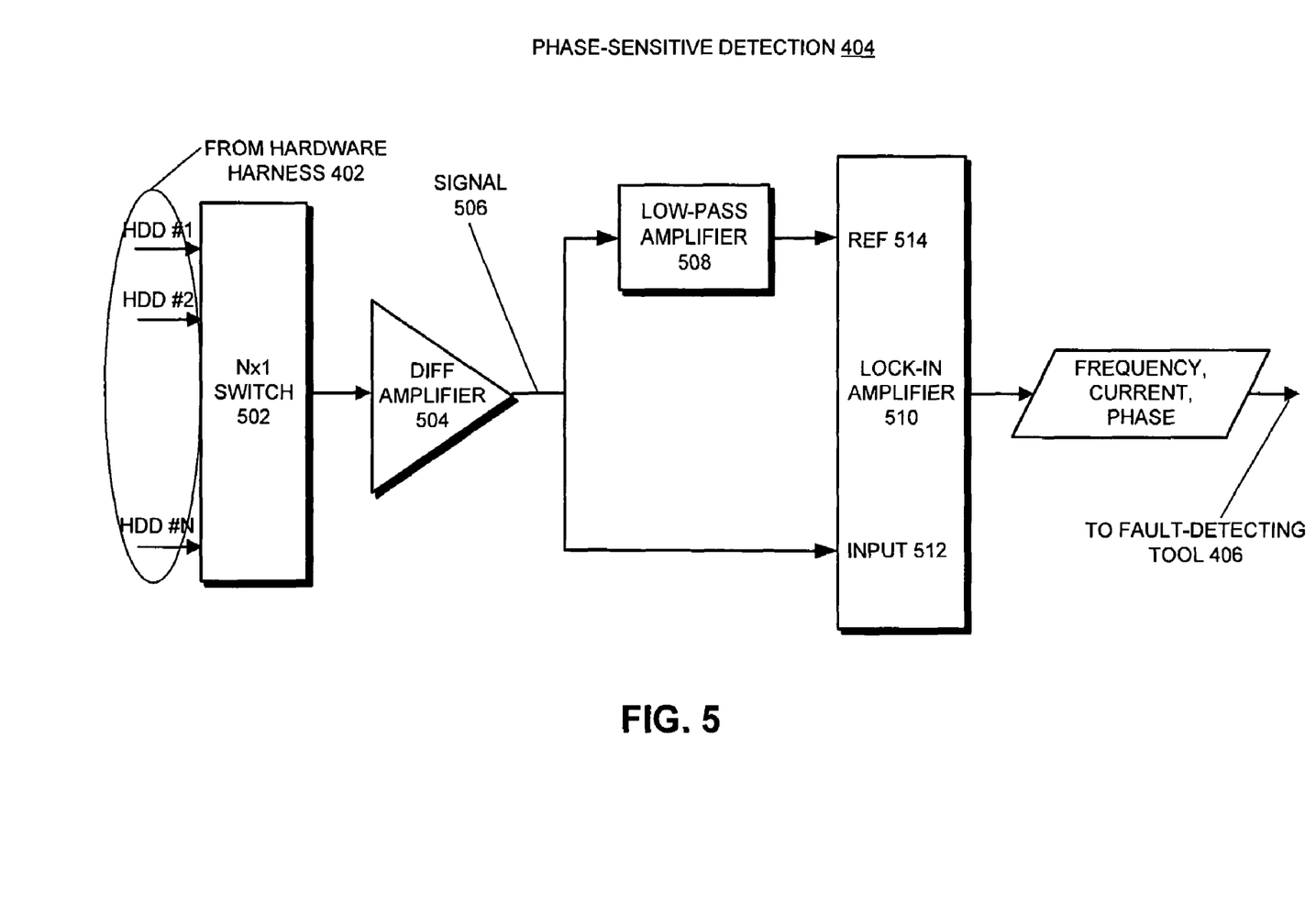
FIG. 5 illustrates a more-detailed structural flow of the phase-sensitive detection in accordance with an embodiment of the present invention.

FIG. 5 illustrates a more-detailed structural flow of phase-sensitive detection 404 in accordance with an embodiment of the present invention.

Phase-sensitive detection 404 begins with an N×1 switch 502 which selects from one of the N input channels and outputs only the selected input. Note that the N input channels are corresponding to the HDDs 1 to N in the storage array, wherein each input channel comprises the time-varying electrical signals measured from the spindle of the associated HDD.

Next, the selected input signal is fed into a differential amplifier 504 which provides common-mode rejection and differential gain when the input signal is in differential mode. Note that differential amplifier 504 is not needed if the input signals are single-ended signals.

Output signal 506 from differential amplifier 504 is then fed into lock-in amplifier 510. More specifically, signal 506 is first split into two branches, wherein one branch serves as the input signal to input 512 of lock-in amplifier 510, and the other branch serves as the reference signal for the input signal of lock-in amplifier 510. Furthermore, prior to feeding the reference signal to reference 514, the reference signal is filtered by a low-pass filter 508. This is useful because signal 506 may contain unwanted high frequency components, such as harmonics of the desired frequency or noise caused by the HDD control circuitry. Hence, using a low-pass filter allows suppression those unwanted frequencies from the reference input.

Next, lock-in amplifier 510 performs phase-lock detection on the input signal. Furthermore, because lock-in amplifier 510 is configured in an external-reference mode, it continuously tracks the frequency of the reference signal. Recall that the reference signal (which is also the input signal) has a frequency component that is a multiple of the spindle-rotation frequency f. Lock-in amplifier 510 is able to identify this frequency, which is subsequently recorded as the time series of the spindle-rotation frequency f(t). Note that during normal spindle operation, the obtained f(t) has a statistically constant value over time. Additionally, through phase-lock detection, lock-in amplifier 510 computes and extracts the amplitude V(t) of the fundamental frequency of the input signal, which is the frequency equal to the reference frequency. Another spindle-rotation parameter that can be extracted through phase-lock detection is phase p(t).

Although f(t), V(t), and p(t) can be continuously measured, discrete time series data is typically used for proactive fault monitoring. Hence f(t), V(t), and p(t) can be sampled at predetermined times $t_i$ to generate time series $\{f(t_i), V(t_i), p(t_i)\}$. For the storage array, an array of time series $[\{f(t_{i\_j}), V(t_{i\_j}), p(t_{i\_j})\}]$ are generated for the array of HDDs, wherein $\{f(t_{i\_j}), V(t_{i\_j}), p(t_{i\_j})\}$ represents time series data for jth HDD measured at time $t_i$. In one embodiment of the present invention, the array of time series $[\{f(t_{i\_j}), V(t_{i\_j}), p(t_{i\_j})\}]$ are created in a sequential order one by one through the HDD array at each time $t_i$. Hence, the time interval between $t_i$ and $t_{i+1}$ should be sufficient long for generating the associated data points for the entire array.

Detecting an Impending Disk Drive Failure

Figure 6:
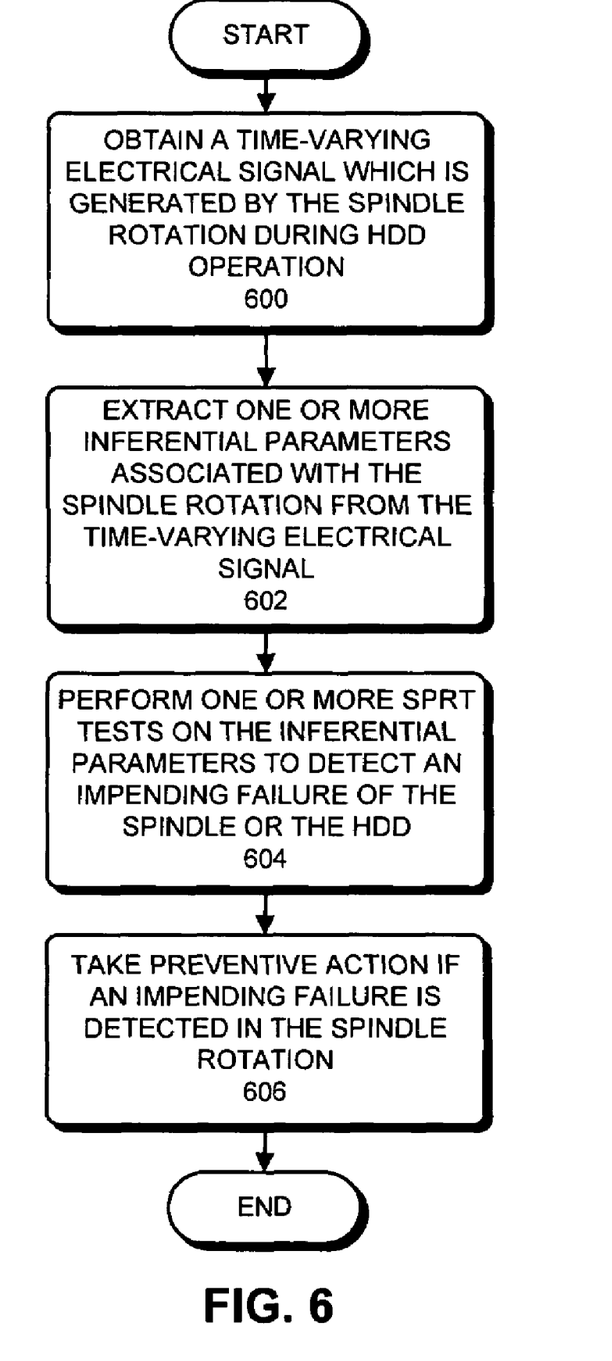
FIG. 6 presents a flowchart illustrating the process of detecting an impending disk drive failure using phase-sensitive detection in accordance with an embodiment of the present invention.

FIG. 6 presents a flowchart illustrating the process of detecting an impending disk drive failure using phase-sensitive detection in accordance with an embodiment of the present invention.

During operation, the system first obtains a time-varying electrical signal which is generated by the spindle rotation during operation of the disk drive (step 600). In one embodiment of the present invention, this time-varying electrical signal is the above-described pole voltage.

Next, the system extracts one or more inferential parameters (e.g., frequency, current, and phase) associated with the spindle rotation from the time-varying electrical signal (step 602). Because the raw electrical signal can be extremely noisy in nature, phase-sensitive detection is used in this step, which typically includes a lock-in amplifier. In one embodiment of the present invention, the lock-in amplifier is configured in the above-described external-reference mode.

The system then performs one or more SPRT tests on the extracted inferential parameters to detect an impending failure of the disk drive (step 604). Note that the SPRT tests can include:

(1) Detecting subtle changes in the frequency of the HDD spindle. For example, the frequency typically changes when the spindle is loaded, experiencing an increase in rotational friction, or is undergoing an increased mechanical degradation;

(2) Detecting changes in the amplitude of the pole voltage in the spindle motor. Note that this amplitude is directly related to the spindle motor current, which is controlled by a feedback mechanism. Hence monitoring the amplitude facilitates monitoring the current-feedback mechanism of the spindle motor; and (3) Detecting changes in the phase of the voltage at the pole of the spindle motor.

Finally, the system uses the outputs from SPRT to generate alarms and/or takes automated actions in real time to prevent a catastrophic failure from occurring: for example, emergency shutdown, backup and shutdown, hot-swap, etc. (step 606).

Note that the SPRT can monitor one or more above-described inferential parameters. Typically, when more inferential parameters are simultaneously monitored, the SPRT test provides higher sensitivity and/or reduced false-alarm and missed-alarm probabilities.

Note the above-described procedure can be performed on a single HDD, or on a HDD array to detect one or more impending failures in the array.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for proactively monitoring a disk drive to detect an impending disk drive failure, comprising:
   obtaining a time-varying electrical signal which is generated by the spindle rotation during operation of the disk drive;
   extracting one or more inferential parameters associated with the spindle rotation from the time-varying electrical signal using a phase-sensitive detection; and
   performing a proactive fault detection on the inferential parameters to detect an impending failure of the disk drive.

2. The method of claim 1, wherein obtaining the time-varying electrical signal associated with the spindle rotation involves measuring a voltage at one or more poles of the spindle motor.

3. The method of claim 1, wherein performing the phase-sensitive detection involves using a lock-in amplifier.

4. The method of claim 1, wherein extracting one or more inferential parameters associated with the spindle rotation from the time-varying electrical signal involves:
   feeding the time-varying electrical signal into a phase-sensitive detection module, wherein the time-varying electrical signal serves as both the input signal and the external-reference signal into the phase-sensitive detection module;
   performing phase-lock detection on the input signal; and obtaining the one or more inferential parameters from outputs of the phase-sensitive detection module.

5. The method of claim 4, wherein prior to feeding the time-varying electrical signal to the phase-sensitive detection module, the method further comprises filtering the time-varying electrical signal using a low-pass filter to remove unwanted frequency components from the electrical signal.

6. The method of claim 1, wherein the inferential parameters can include:
   a frequency of the rotation;
   an amplitude associated with a current passing through the spindle motor; and
   other inferential parameters associated with the spindle rotation.

7. The method of claim 1, wherein the method further comprises constructing time series of the inferential parameters to facilitate the proactive fault detection.

8. The method of claim 1, wherein the method is performed on an array of disk drives to detect one or more impending failures in the disk drives.

9. The method of claim 1, wherein obtaining the time-varying electrical signal associated with the spindle rotation involves using a differential amplifier to provide common-mode rejection.

10. The method of claim 1, wherein performing the proactive fault detection involves using Sequential Probability Ratio Test (SPRT).

11. A computer-readable storage medium storing instructions that when executed by a computer cause the computer to perform a method for proactively monitoring a disk drive to detect an impending disk drive failure, the method comprising:
   obtaining a time-varying electrical signal which is generated by the spindle rotation during operation of the disk drive;
   extracting one or more inferential parameters associated with the spindle rotation from the time-varying electrical signal using a phase-sensitive detection; and
   performing a proactive fault detection on the inferential parameters to detect an impending failure of the disk drive.

12. The computer-readable storage medium of claim 11, wherein obtaining the time-varying electrical signal associated with the spindle rotation involves measuring a voltage at one or more poles of the spindle motor.

13. The computer-readable storage medium of claim 11, wherein extracting one or more inferential parameters associated with the spindle rotation from the time-varying electrical signal involves:
   feeding the time-varying electrical signal into a phase-sensitive detection module, wherein the time-varying electrical signal serves as both the input signal and the external-reference signal into the phase-sensitive detection module;
   performing phase-lock detection on the input signal; and
   obtaining the one or more inferential parameters from outputs of the phase-sensitive detection module.

14. The computer-readable storage medium of claim 13, wherein prior to feeding the time-varying electrical signal to the phase-sensitive detection module, the method further comprises filtering the time-varying electrical signal using a low-pass filter to remove unwanted frequency components from the electrical signal.

15. The computer-readable storage medium of claim 11, wherein the inferential parameters can include:
   a frequency of the rotation;
   an amplitude associated with a current passing through the spindle motor; and
   other inferential parameters associated with the spindle rotation.

16. The computer-readable storage medium of claim 11, wherein the method further comprises constructing time series of the inferential parameters to facilitate the proactive fault detection.

17. The computer-readable storage medium of claim 11, wherein the method is performed on an array of disk drives to detect one or more impending failures in the disk drives.

18. The computer-readable storage medium of claim 11, wherein obtaining the time-varying electrical signal associated with the spindle rotation involves using a differential amplifier to provide common-mode rejection.

19. The computer-readable storage medium of claim 11, wherein performing the proactive fault detection involves using Sequential Probability Ratio Test (SPRT).

20. An apparatus that proactively monitors a disk drive to detect an impending disk drive failure, comprising:
   an input configured to receive a time-varying electrical signal which is generated by the spindle rotation during operation of the disk drive;
   a phase-sensitive detection mechanism configured to extract one or more inferential parameters associated with the spindle rotation from the time-varying electrical signal; and
   a proactive fault detection mechanism configured to perform detection on the inferential parameters to detect an impending failure of the disk drive.

21. The apparatus of claim 20, wherein the input is configured to measure a voltage at one or more poles of the spindle motor.

22. The apparatus of claim 20, wherein the phase-sensitive detection mechanism includes a lock-in amplifier.

23. The apparatus of claim 20, wherein the phase-sensitive detection mechanism is configured to:
   feed the time-varying electrical signal into a phase-sensitive detection module, wherein the time-varying electrical signal serves as both the input signal and the external-reference signal in the phase-sensitive detection module;
   perform phase-lock detection on the input signal; and to
   obtain the one or more inferential parameters from outputs of the phase-sensitive detection module.

24. The apparatus of claim 23, wherein the phase-sensitive detection mechanism is further configured to filter the time-varying electrical signal using a low-pass filter to remove unwanted frequency components from the electrical signal.

25. The apparatus of claim 20, further comprising a construction mechanism configured to construct time series of the inferential parameters to facilitate the proactive fault detection.

26. The apparatus of claim 20, wherein the apparatus is used on an array of disk drives to detect one or more impending failures in the disk drives.

27. The apparatus of claim 20, wherein the phase-sensitive detection mechanism is further configured to use a differential amplifier to provide common-mode rejection.

* * * * *